Dec. 27, 1938.
T. M. BRUECK
2,141,681
LENS AND DIAPHRAGM ASSEMBLY
Filed Aug. 21, 1937
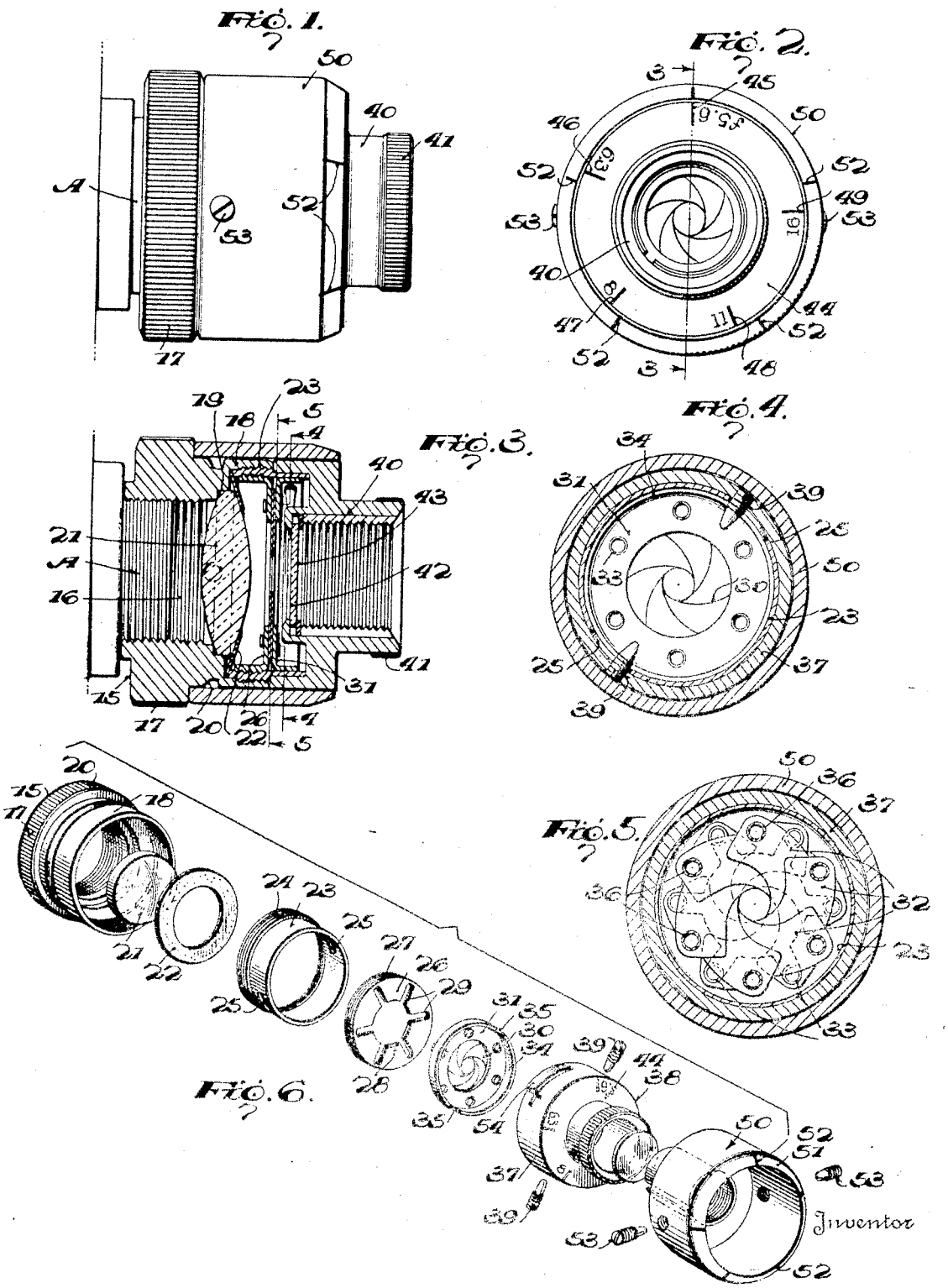
Inventor
Theodore M. Brueck.
By
Attorney Patented Dec. 27, 1938

2,141,681

UNITED STATES PATENT OFFICE 2,141,681

LENS AND DIAPHRAGM ASSEMBLY

Theodore M. Brueck, Rochester, N. Y., assignor to Ilex Optical Company, Rochester, N. Y., a corporation of New York Application August 21, 1937, Serial No. 160,339

3 Claims. (Cl. 116—124)

The present invention relates to lens and diaphragm mountings for cameras, and more particularly to an assembly for the support and adjustment of lens and diaphragm apparatus with particular reference to miniature cameras of various types for moving or still pictures, the primary object of the invention being the provision of a small compact apparatus in which the parts are closely associated in the assembly and in an arrangement which promotes effective support of the lens and quick, easy adjustment of the diaphragm.

Among its many other objects, the invention aims to provide a diaphragm holding and adjusting arrangement in small condensed and compact form, in which the stop graduations are so related to a novel index point arrangement as to preclude confusion in the diaphragm adjustment and promote simple, easy adjusting movements which are substantially foolproof insofar as results are concerned.

A still further object is the provision of a small compact assembly in which the parts are effectively and efficiently related so as to reduce the same to a minimum in number, promote ready and easy manufacture, as well as assembly thereof, and insure accuracy in an easy, quick setting of the parts after assembly for subsequent efficient adjustment.

With the foregoing in mind, other and further objects of the invention as well as the resulting advantages thereof will be apparent from a careful consideration of the following description of the invention in detail, reference being made to the accompanying drawing which forms a part of this specification and in which, Figure 1 is a side view of the improved assembly;

Figure 2 is a front elevation thereof;

Figure 3 is a vertical longitudinal section taken therethrough substantially on line 3—3 of Figure 2;

Figures 4 and 5 are vertical transverse sections taken respectively on lines 4—4 and 5—5 of Figure 3, and Figure 6 is a detail perspective view showing the several parts of the assembly exploded.

Referring now to these figures, the assembly as proposed by the present invention is intended for threaded application to the threaded portion A of a camera, as shown in Figures 1 and 3, and its tubular body portion or holder 15 has its smaller bore at the rear portion threaded as at 16 to engage the threaded portion A of the camera. This portion of the holder 15 has an external knurled band 17 facilitating its connection to the camera, and this band is of somewhat greater external diameter than the remaining forwardly extending portion 18 of the holder, whose internal diameter is greater than the internal diameter of the rear threaded portion of the holder so as to form between these portions of unequal diameter a shouldered lens seat 19 internally and annularly of the holder intermediate its ends, as well as a forwardly facing flat surface between the lens seat 19 and the inner surface of the forwardly projecting portion of the holder, which portion is internally threaded for a purpose to be presently made plain. The holder 15 is also provided with an annular groove 20 in its external surface approximately opposite the lens seat 19, in the latter of which a lens 21 is seated and held by a spring washer or clamping ring 22 against its outer face and also against the internal forwardly facing surface of the holder 15 located, as before mentioned, around the forward portion of the lens seat 19.

Within the forward internally threaded portion 18 of the holder, a tubular diaphragm holding member 23 screws, the rear portion of this tubular member 23 having external threads 24 to engage the before-mentioned internal forward threads of the holder 15. The rear end of the tubular member 23 is adapted to abut the spring clamping member or washer 22, and the diaphragm holder thus serves as a lens clamping member. The forward portion of the tubular diaphragm holding member 23 projects beyond the forward end of the holder 15, and its projecting portion is provided at diametrically opposite points with short circumferentially arranged slotted openings 25, whose purpose will presently appear.

Within the tubular diaphragm holding member 23 and preferably held therein by a snug driving fit is a stationary diaphragm controlling member 26 consisting of a disk, whose peripheral edge flange 27 snugly contacts the internal surface of the tubular diaphragm holding member 23. This disk has a central opening 28 and is provided with a series of slots 29 radiating from its central opening 28 and equal in number to the iris blades comprising the diaphragm 30.

The diaphragm 30 is carried by a ring 31, to which its several blades 32 are pivoted at circumferentially spaced points 33, these blades being disposed upon that face of the ring 31 which is next to the diaphragm controlling disk 26. The diaphragm supporting ring 31 has a peripheral flange 34, which is rotatably disposed within the forwardly projecting portion of the tubular diaphragm holding member 23 and has at diametrically opposite points recesses 35 registering with the slotted openings 25 before mentioned. The diaphragm blades 32 have at their free end portions rearward projections 36 which, in the assembly, extend into the radial slots 29 of the diaphragm controlling disk 26, so that, upon rotative movement of the ring 31, projections 36 of the blades will be forced to move radially in the slots 29 so that the blades as a series will be adjusted to define a smaller or larger light receiving aperture within the diaphragm ring, dependent upon the direction of such rotative movement.

Telescoping the forwardly projecting slotted portion of the tubular diaphragm holding member 23 is the enlarged rear portion 37 of the diaphragm adjusting member, generally indicated at 38, which said rear portion is of approximately the same external diameter as that of the forwardly extending portion 18 of the holder 15 as will be plainly seen by reference to Figure 3, and which said portion of the adjusting member 38 has at diametrically opposite points threaded openings for the reception of set screws 39 having inner rounded ends adapted to extend through the slotted openings 25 of the tubular diaphragm holding member 23 and into the diametrically opposed recesses 35 of the diaphragm ring 31. Set screws 39 thus not only serve to hold the adjusting member 38 in proper telescoping relation on the forward portion of the tubular diaphragm holding member 23 but also serve to communicate rotative adjusting movements of the adjusting member 38 to the diaphragm ring 31, these rotative adjusting movements being limited, of course, by the lengths of the slotted openings 25 so that, when the inner ends of the set screws 39 are at one end of the slots 25, the diaphragm 30 is reduced to its smallest opening and, when they are at the opposite end of the slots, the diaphragm 30 is expanded to its greatest opening.

The enlarged rear portion 37 of the rotatable adjusting member 38, which forms the forward member of the assembly, is in the nature of an angularly annularly flanged portion of its somewhat smaller forwardly extending body portion 40 having an external knurled ring 41 to facilitate its rotative adjusting movements and having its bore provided with internal threads or an otherwise treated internal surface to break up and prevent reflected light rays from creating distortion of light rays through the lens 21. In the inner end of the bore of this body portion 40, adjacent to the diaphragm supporting ring 31, the adjusting member has an internal annular channel in which there is preferably seated a plain glass disk 42, which may be held by a split ring 43, and the function of which is to protect the lens against the entry of dirt, dust and other contaminating matter.

Obviously, the parts as above related to one another in the assembly bring about a compact arrangement in which the central openings of the diaphragm controlling disk 26, diaphragm supporting ring 31, and the bore of the adjusting member 38 are in alignment, and the axial plane of which coincides with the axial plane of the light receiving aperture of the lens defined by the diaphragm blades and controlled as to size by the relative positions of these blades. Obviously, also the relative positions of the blades are in turn controlled by the position of the forward adjusting member 38 rotatable with respect to the stationary diaphragm holding tube 23, for which reason the forwardly facing annular surface 44 of the adjusting member 38 between its forward and rear portions of different diameters is provided with a series of spaced apart and plainly designated stop graduations 45, 46, 47, 48 and 49, according to the showing in Figure 2. Assuming, for instance, the use of a f5.6 lens, and a five-stop adjustment, the stop 45 coinciding with the largest opening of the diaphragm is marked f5.6, the next stop graduation 46 being marked 6.3, the next graduation 47 being marked 8, the next graduation 48 being marked 11, and the final graduation 49 being marked 16 and coinciding with the position of smallest opening of the diaphragm. These graduation markings corresponding to the various diaphragm stops, may, of course, be changed, and more or less in number utilized, according to the requirements and the particular lens in use, but it is one of the important features of the present invention that these graduations be so spaced on the diaphragm adjusting member, preferably, though not necessarily, entirely around its annular forwardly facing surface 44, that it is not possible in use to confuse the marking of any graduation other than the one which it is intended to denote. In other words, the scale graduations for the stops are so placed on the adjusting member that each, with its respective stop marking, is spaced such a distance from the other stop graduations as to be substantially isolated therefrom.

To permit of the use of stop graduations on the adjusting member in the manner above described, in spite of the relative slight range of rotative adjusting movement of the adjusting member 38, an index member is utilized, having a series of index points so spaced apart that each index point cooperates independently with one of the stop graduations, the several index points of the series being equidistantly spaced apart as compared to the unequal spacing of the several stop graduations 45 to 49, inclusive.

To the above end, a sleeve 50 is disposed circumjacent the enlarged portion 37 of the adjusting member 38 and the forward portion 18 of the holder, which sleeve is of a length to extend from the knurled band 17 of the holder 15 to the forwardly facing annular surface 44 of the adjusting member, the latter or forward end of the sleeve 50 presenting a beveled annular edge 51 on which a series of index points 52 are arranged in the form of index marks, conforming to the number of stop graduation marks and equidistantly spaced from one another.

The sleeve 50 is slipped over the above-mentioned parts which it embraces after assembly of these parts, and is provided adjacent to its rear end with diametrically opposed internally threaded apertures for the reception of set screws 53, whose inner ends project into the annular groove 20 of the holder. Thus, before the set screws 53 are tightened to clamp the sleeve 50 stationarily with respect to the holder 15, the adjusting member 38 is turned either to full-open or full-closed position, or, in other words, until its set screws 39 are at either one or the other of the ends of the slotted openings 25 before mentioned. Then with the adjusting member so positioned, the sleeve 50 is shifted circumferentially until one of its index points is aligned with the stop graduation 45, if the adjusting member has been moved to the full-open position of the diaphragm as shown in Figure 2, or to align with the stop graduation 49 if the adjusting member has been moved to the position of smallest diameter of diaphragm opening. In either instance, when so positioned, the set screws 53 are then screwed tightly into place and the sleeve thus stationarily locked in connection with the holder. In furtherance of the above, it will be noted from a careful inspection of Figure 3 that the annular groove 20 of the holder 15 is formed with a substantially perpendicular forward wall, so that the tapering inner locking ends of the set screws 53 will not only have a wedging action within the groove 20 when screwed tightly therein but will also, in bearing against the perpendicular forward wall of the groove, have a tendency to shift the sleeve 50 bodily in a rearward direction so as to clamp or jam its rear end against the shoulder formed by the annularly enlarged knurled band 17 of the holder to thus constitute an additional friction lock for defeating accidental circumferential movement of the sleeve 50 after the latter has been once adjusted and secured.

Preferably, also, the enlarged rear portion 37 of the adjusting member 38 is transversely and circumferentially slitted to form a friction tongue 54, as best seen in Figure 6, this tongue being upset in an external direction for frictional engagement with the inner surface of the sleeve 50, so that when the adjusting member 38 has been shifted to align any one of the stop graduations 45 to 49, inclusive, independently with its respective index point 52, to set the diaphragm at the desired opening, it will be maintained in such position by the frictional engagement of tongue 54 with the sleeve 50, against accidental displacement, which might otherwise result from the jarring of the camera as it is brought to focus upon the objective.

While not necessarily so, it is preferable, as shown plainly by a comparison of Figures 2 and 6, that the index points and stop graduations be distributed around the entire circumference, respectively, of the sleeve 50 and the adjusting member 38, especially in the small compact assembly to which the present invention particularly relates and in which such a complete annular disposition is believed to be particularly effective in promoting adjustments which may be easily and intelligently effected by the present arrangement without danger of confusion or the possibility of mistake.

The present assembly has been disposed in connection with but a single lens 21, inasmuch as it finds its greatest advantages in use with what is known as universal focus cameras, though it is obvious similar diaphragm supporting and adjusting apparatus might also be effectively employed with an assembly embodying lens, one of which is adjustable with respect to another for adjusting the range of focus.

What is claimed is:

1. In a diaphragm assembly and the like having adjusting means of limited movement including adjusting members, one at least of which is shiftable relative to the other during such limited adjustment, means for indicating relative adjustment of said members comprising a series of index points in spaced apart relation on one of said members, and a corresponding series of stop graduations on the other member in progressively increasing spaced relation through the series with respect to the spacing of the index points, the two series of index points and stop graduations being relatively arranged whereby in the adjusting movement of the adjusting members each stop graduation is limited to registry with but a single corresponding index point nearest thereto.

2. In a diaphragm assembly and the like having adjusting means of limited movement including adjusting members one at least of which is shiftable relatively to the other, means for indicating relative adjustment of said members comprising a series of index points at equi-distantly spaced points on one of said members and a corresponding adjacently disposed series of stop graduations on the other member spaced apart progressively increasing distances with respect to the spacing of the index points, the relative arrangement of said series of graduations and index points being such that during limited relative movement of the adjusting members each graduation is limited to registry with but a single corresponding index point nearest thereto in the series of index points.

3. In a diaphragm assembly including adjusting members one of which has limited rotation relative to the other, means for indicating the adjustment of said members comprising a series of index points equi-distantly spaced entirely around one of said members, and a corresponding adjacently located series of stop graduations around the other member, progressively spaced increasing distances in the series relative to the spacing of the index points, each stop graduation being limited, in the adjusting movement of said members, to registry with but the nearest and corresponding index point of the series of index points.

THEODORE M. BRUECK.